United States Patent [19]

Sikking et al.

[11] Patent Number: 5,360,625
[45] Date of Patent: Nov. 1, 1994

[54] BAKERY CUSTARD

[75] Inventors: Rob Sikking, Gouda; Jeroen J. Brockhus, Breda; Jacobus L. Scholtes, Rotterdam, all of Netherlands

[73] Assignee: Unilever Patent Holdings B.V., Vlaardingen, Netherlands

[21] Appl. No.: 103,695

[22] Filed: Aug. 10, 1993

[30] Foreign Application Priority Data

Aug. 21, 1992 [EP] European Pat. Off. ........ 92202560.6

[51] Int. Cl.$^5$ ............................................. A23L 1/05
[52] U.S. Cl. ................... 426/573; 426/578; 426/576; 426/653; 426/574
[58] Field of Search ............... 426/573, 575, 576, 578, 426/579, 653, 574

[56] References Cited

U.S. PATENT DOCUMENTS 3,674,507 7/1972 Carasso .
4,479,973 10/1984 Holley ................................. 426/573
4,623,552 11/1986 Rapp ................................... 426/573
4,722,851 2/1988 Kadan et al. ....................... 426/573

FOREIGN PATENT DOCUMENTS 2349285 11/1977 France .
3141319 4/1983 Germany .
3319072 11/1984 Germany .
53664 7/1967 Luxembourg .
2110517 6/1983 United Kingdom .
8603377 6/1986 WIPO .

Primary Examiner—Jeanette Hunter
Attorney, Agent, or Firm—Cushman, Darby & Cushman

[57] ABSTRACT

The invention concerns ready-to-use bakery custard with long shelf-life. These products comprise:
60–95 wt % of a fat emulsion
0.01–20 wt % of a sweetener
2–10 wt % of a UHT-stable starch
1–5 wt % of a gelatin
0.01–5 wt % of a UHT stable hydrocolloid and has a pH=6.5–7.5

Stevens hardness of the product is 50–250 and viscosity at 50 s$^{-1}$ ranges from 3,000–20,000 mPa.s

17 Claims, No Drawings

BAKERY CUSTARD

In the prior art, known so far, two types of bakery custards are disclosed, i.e.

(1) a traditional bakery custard, comprising ingredients such as whole-milk, sugar, native starch and egg-white and/or egg-yolk. Although these custards are of high quality they have a number of disadvantages. E.g.: these custards are not ready-to-use; i.e. before the application of these custards they need to be cooked in order to gelatinize the starch and to be cooled again afterwards; further the shelf-life of those products is short, i.e. about 3 days at 5° C., which is due to the fact that the products can only be pasteurized and not sterilized.

(2) an instant bakery custard, comprising whole milk powder, sugar, modified starch (cold-gelling) and hydrocolloids. However, these instant custards are in powder form and need to be mixed with water and have to stand for a considerable time (at least 15 mins) before application, so that they are not ready-to-use products. Further, as the products can not be sterilized, the shelf-life is only about 3 days at 5° C. Moreover the consistency of above two custards is such, that they are gels both at ambient and at higher (above 60° C.) temperatures.

Unless the fact that pourable custards, which are not suitable for bakery application, because its viscosity is too low, were also known, bakery custards which are ready-to-use and which have a long shelf-life, a high quality, a suitable consistency in order to be able to remove them from the packaging material, which are pipeable at filling temperature, have good eating properties, such as short texture, freshness and frank taste, were not developed.

As such bakery custards would provide a high convenience for the consumer, in particular for the bakers, such custards are highly desired.

In our research to develop such custards, we found that ready-to-use bakery custards with a long shelf-life and without having to apply a preservative are obtained, when these custards have the following composition:

65-95 wt % of a water continuous fat emulsion with a fat content of 0.1-10 wt % and containing 0.01-8 wt % of a protein (ii) 0.01-20 wt % of a sweetener (iii) 2-10 wt % of a modified starch, suitable for UHT-conditions (iv) 1-5 wt % of a gelatin relating compound, capable of forming a gel at ambient temperature (v) 0.01-5 wt % of a hydrocolloid, other than gelatin, suitable for UHT-conditions and which has gelling properties at temperatures below 60° C.;

(vi) and have a pH=6.5-7.5; those custards display a Stevens-hardness at 20° C. without whipping of 50-250 g/cm$^2$ and after a slight whipping by hand or machine of 20-70 g/cm$^2$, while its upwards viscosity at room temperature, after the slight whipping, at 50 s$^{-1}$ is 4,000-20,000 mPa.s and its corresponding downwards viscosity is 3,000-15,000 mPa.s.

It was found that compositions fulfilling the above requirements could easily be sterilized (1-20 sec. at 130°-150C.) without destroying their product properties, imparting to the products a shelf-life of at least 4 months at 20° C.

Suitable water-continuous fat emulsion can be selected from whole-milk (3.5 wt % fat and 2% milk protein), low-fat milk (1.5 wt % fat), skimmed milk (0.1 wt % fat), while also fat emulsions of vegetable fats, such as palm fats, palm kernel fats, rape fats, sunflower fats etc. or from whole milk powder or skimmed milk powder can be applied. The fat content of those fat emulsions is generally 1.5-4.0 wt % and its protein-content is generally 1.0-2.5 wt %. The proteins that can be applied are preferably milk-proteins, such as caseinate or whey-proteins. However, also other protein sources can be applied, e.g. egg protein (both egg-white and egg-yolk), vegetable proteins (e.g. soy-proteins), but also blood proteins, such as bovine proteins.

The preferred amount of water continuous fat emulsion in our custards is 70-85 wt %.

In order to impart a desired sweet taste to our custards a sweetener, in particular carbohydrates such as sucrose and/or lactose, but also high-intensity sweeteners such as aspartame can be applied in our custards. Carbohydrates are preferably used in amounts of 10-20 wt %. A preferred carbohydrate mixture consists of sucrose and lactose in a weight-ratio sucrose: lactose of at least 3.0. High intensity sweeteners are applied in amounts of 0.01-1 wt %, in those cases, however, the space in the recipe can be filled by addition of a maltodextrin and/or glucose-syrup, in particular in amounts of 10-19 wt %.

In order to make our custards suitable for sterilization conditions it is imperative that a modified starch, suitable for UHT-conditions and that a hydrocolloid, suitable for UHT-conditions are present in the compositions.

We found that application of 2-5 wt % of such a modified starch and 0.05-0.5 wt % of such a hydrocolloid provided compositions with the required properties. Modified starches that are known to be suitable for UHT-conditions are in particular the modified starches from the H- and R-classes of the Benelux-classification for modified starches, which are identical with the classes E1422 and E 1442 of the EEC classification. Commercial modified starches belonging to above classes are e.g.: Pureflo, Thermflo, National 780188, Firmtex, Hiflo, National Frigex, National Frigex IV, National Frigex L.V.; Purity VL, Collflo 67, Purity HPC, Thermtex (all from National Starch); Clearam CH-30 (from Roquette) and from Avebe the Farinex-type products: VA 70; VA 100T; CAX; TK-1; VA 70 C or CA. Preferred modified starches are derived from waxy-maize or from tapioca. Hydrocolloids that can be applied can be chosen from the group consisting of: carrageenan, guar gum, hydrolyzed or depolymerized guar gum, locust bean gum, agar, xanthan gum, cassia gum, tara gum, rhamsan gum, welan gum, carboxy methylcellulose or mixtures thereof. Those hydrocolloides are applied in amounts of 0.05-0.5 wt %. A preferred hydrocolloid is a mixture of carrageenan and hydrolyzed guar gum with a weight ratio of 2:1-1:2. This mixture is applied in an amount of 0.1-0.5 wt %.

The presence of the hydrocolloids is essential in order to assure that the compositions display a thermoreversible gelling behaviour. This is important to make sure that the custard is liquid in the UHT-line, during its processing, whereas it is gelated in its packed form. The gelation makes that the custard can easily be removed from the packaging material as one lump, which makes that no custards remains sticked to the package material.

In order to assure that the custard has the required consistency (Stevens-hardness; viscosity) after the UHT-treatment it is essential that 1–5 wt % of a gelatin relating compound, capable of forming a gel at ambient temperature is incorporated in the custard. Gelatin relating compounds that are suitable can be obtained both along the acidic and along the alkaline-route- The source for the gelatin is irrelevant, so both pig and calf gelatin can be applied.

It is, however, preferred to use gelatin with a bloomrate of more than 100 (in amounts of 1–2.5 wt %). The most preferred however, is to use acidic gelatin with a bloomrate of more than 200.

It was found that the quality of the custard is better, when the bloomrate of the gelatin is higher and when this latter is applied in smaller quantities.

In order to define the consistency of our bakery custards we have measured its Stevens-hardness at 20° C. before whipping and after slight whipping (by hand or by using a Hobart-mixer, this whipping being performed until a constant consistency of the product) and its viscosity (both upwards and downwards) at ambient temperatures at a shear rate of 50 s$^{-1}$. The Stevens-hardness was measured using a Stevens LFRA-texture analyser, using a probe of 12 mm diameter, a penetration speed of 1 mm/sec and a penetration depth of 20 mm.

The viscosities were measured on a Haake RV-2 viscosimeter with a spindle MV II, using an A-factor=5.00, an M-factor of 0.44, an E-factor=1 and an R-factor=1.

We found that whipped custards that are very satisfactory have a Stevens-hardness of 20–700 g/cm$^2$ preferably of 30–60 g/cm$^2$ an upward-viscosity of 4,000–20,000 mPa.s, in particular of 5,000–15,000 mPa.s and an downward-viscosity of 3,000–15,000 mPa.s, in particular of 4,000–8,000 mPa.s.

Part of the invention are also bakery products, such as vanilla slices (or mille-feuille or tompoes) and creme mousseline wherein at least partly the bakery custard according to the invention is incorporated. In the custard also a flavour can be introduced, e.g. during the slight whipping of the custard.

The bakery custards are prepared according to a method, wherein
1) a premix is made at 40°–70° C. of the water continuous fat emulsion, the sweetener, the modified starch, the gelatin relating compound and the hydrocolloid(s)
2) the pH of the premix is adjusted to pH=6.5–7.5 if necessary, e.g. by addition of base
3) the premix is heated indirectly to 50°–100° C.
4) the heated premix is sterilized indirectly at T=130°–150° C. during 1–20 seconds
5) the sterilized product is cooled indirectly to 20°–70C.
6) whereupon the sterilized product is packed aseptically.

The indirect heat exchange can be performed using any indirect system, preferably a tubular heat-exchanger, or scraped surface heat exchanger. Also an ohmic heater can be applied for the sterilization.

EXAMPLE I

Recipe:
5% Pureflo ® starch (E 1442)
68.6% water
7.7% whole milk powder
17% sugar
1.5% acid gelatine of 250 bloom
0.1% hydrolyzed guar gum
0.1% mixture of kappa- and iota-carrageenan Processing: The ingredients are well mixed at 50° C. and the pH is adjusted with NaOH to pH=7.0. The capacity is 150 kg/hr, total pressure 6 bar. The premix is sterilized in an SSHE at 140° C. with 200 rpm for 10 seconds and cooled in a second SSHE to 40° C. with 100 rpm and packed aseptically.

Analysis:  Stevens value at 20° C. before whipping: 87 g/cm$^2$
Stevens value at 20° C. after whipping: 40 g/cm$^2$
Viscosity after whipping at 50 s$^{-1}$ upwards at 20° C.: 9,200 mPa · s
Viscosity after whipping at 50 s$^{-1}$ downwards at 20° C.: 5,500 mPa · s

EXAMPLE 2

Recipe:
5% National Frigex LV starch ® (E 1442)
76.4% whole milk
17% sugar
1.2% acid gelatin of 250 bloom
0.1 % mixture of kappa- and iota carrageenan Processing: The ingredients are well mixed at 60° C. and the pH is adjusted with NaOH solution to neutral. The capacity is 76 kg/hr with a total pressure of 9 bar. Preheating to 90° C. in a THE is followed by sterilization at 140° C. for 11 seconds in a THE. The product is cooled till 60° C. in a THE and packed aseptically.

Analysis:  Stevens value at 20° C. before whipping: 98 g/cm$^2$
Stevens value at 20° C. after whipping: 48 g/cm$^2$
Viscosity after whipping at 50 s$^{-1}$ upwards at 20° C.: 11,000 mPa · s
Viscosity after whipping at 50 s$^{-1}$ downwards at 20° C.: 7,200 mPa · s

EXAMPLE 3

Recipe:
3% Clearam CH$_{30}$ starch ® (E 1422)
69.9% water
7.5% skimmed milk powder
1% egg-yolk powder
17% sugar
1.5% alkaline gelatine of 180 bloom
0.1% mixture of kappa- and iota-carrageenan Processing: The ingredients are well mixed at 40° C. and the pH is adjusted with NaOH to neutral. The capacity is 75 kg/hr with a total line pressure of 9.5 bar. Pre-heating to 80° C. in a THE is followed by sterilisation at 135° C. for 11 seconds in a THE. Cooling till 59° C. takes place in a THE before the product is packed aseptically.

Analysis:  Stevens value at 20° C. before whipping: 81 cm/m$^2$
Stevens value at 20° C. after whipping: 30 g/cm$^2$
viscosity after whipping at 50 s$^{-1}$ upwards at 20° C.: 13,500 mPa · s
viscosity after whipping at 50 s$^{-1}$ downwards at 20° C.: 6,500 mPa · s

EXAMPLE 4

Recipe:
3% Clearam CH$_{30}$ starch ® (E 1422)
77.3% low fat milk

17% sugar
2.4 % acid gelatine of 210 bloom
0.225% lambda-carrageenan

Processing: The ingredients are well mixed at 40° C. and the pH is adjusted with NaOH solution to neutral. The capacity is 77 kg/hr with a total line pressure of 14 bar. The premix is pre-heated to 79° C. in a THE and sterilized at 130° C. for 16 seconds in a THE. The product is cooled to 78° C. in a THE and packed aseptically.

Analysis: Stevens value at 20° C. before whipping: 130 g/cm$^2$
Stevens value at 20° C. after whipping: 40 g/cm$^2$
Viscosity after whipping at 50 s$^{-1}$ upwards at 20° C.: 14,700 mPa · s
Viscosity after whipping at 50 s$^{-1}$ downwards at 20° C.: 5,400 mPa · s

We claim:

1. Ready-to-use bakery custard with a long shelf-life, comprising;
   (i) 65–95 wt %, preferably 70–85 wt % of a water continuous fat emulsion with a fat content of 0.1–10 wt % and containing 0.01–8 wt % of a protein
   (ii) 0.01–20 wt % of a sweetener
   (iii) 2–10 wt %, preferably 2–5 wt % of a modified starch, suitable for UHT-conditions
   (iv) 1–5 wt % of a gelatin relating compound, capable of gel formation at ambient temperature
   (v) 0.01–5 wt % of a hydrocolloid, other than gelatin, suitable for UHT-conditions and which has gelling properties at temperatures below 60° C.
   (vi) a pH of 6.5–7.5
   which bakery custard displays:
   (i) a Stevens-hardness at 20° C. without whipping of 50–250 g/cm$^2$
   (ii) a Stevens-hardness at 20° C. after a slight whipping of 20–70 g/cm$^2$
   (iii) an upwards viscosity at room temperature, after a slight whipping, at 50 s$^{-1}$ of 4,000–20,000 mPa.s
   (iv) a downwards viscosity at room temperature, after a slight whipping, at 50 s$^{-1}$ of 3,000–15,000 mPa.s.

2. Ready-to-use bakery custard according to claim 1, wherein the water-continuous fat emulsion is selected from the group consisting of whole-milk, low fat milk, skimmed milk and fat emulsions of vegetable fats, or derived from whole milk powder or skimmed milk powder, while the fat content of the emulsion ranges from 1.5–4 wt %.

3. Ready-to-use bakery custard, according to claim 1, wherein the protein component of the water continuous fat emulsion is selected from the group consisting of milkproteins, in particular caseinate and whey-proteins, egg-proteins, in particular egg-white and egg-yolk proteins; vegetable proteins, in particular soy-proteins, while the protein content of the emulsion is 1 to 2.5 wt %.

4. Ready-to-use bakery custard according to claim 1, wherein the sweetener is selected from the group consisting of carbohydrates, in particular sucrose and/or lactose and high-intensity sweeteners, in particular aspartame.

5. Ready-to-use bakery custard, according to claim 1, wherein 10–20 wt % of a carbohydrate or mixture of carbohydrates is present.

6. Ready-to-use bakery custard, according to claim 5, wherein a mixture of sucrose and lactose with a weight ratio of at least 3 (sucrose: lactose) is present.

7. Ready-to-use bakery custard, according to claim 1, wherein 0.01–1 wt % of a high-intensity sweetener is present, while in addition to the high-intensity sweetener 10–19 wt % of a maltodextrin or glucose-syrup is present.

8. Ready-to-use bakery custard according to claim 1, wherein the modified starch is selected from starches from EEC-Classes E 1422 or E 1442, such as starches derived from waxy maize or tapioca.

9. Ready-to-use bakery custard according to claim 1, wherein 1–2.5 wt % of a gelatin with a bloomrate of more than 100, preferably an acidic gelatin with a bloomrate of more than 200 is present.

10. Ready-to-use bakery custard, according to claim 1, wherein 0.05–0.5 wt % of a hydrocolloid, selected from the group consisting of carrageenan, guar gum, hydrolyzed or depolymerized guar gum, locust bean gum, agar, xanthan gum, cassia gum, tara gum, rhamsan gum, welan gum, carboxy methylcellulose and mixtures thereof, is present.

11. Ready-to-use bakery custard according to claim 10, wherein 0.1–0.5 wt % of a mixture of carrageenan and hydrolyzed guar gum in a weight-ratio of 1:2–2:1 is present.

12. Ready-to-use bakery custard according to claim 1, wherein the stevens-hardness at 20° C. without whipping is 80–150 g/cm$^2$; the stevens-hardness at 20° C. after a slight whipping is 30–60 g/cm$^2$; the upward-viscosity after a slight whipping is 5,000–15,000 mPa.s (20° C., 50 s$^{-1}$) and the downward viscosity, after a slight whipping, is 4,000–8,000 mPa.s (20° C., 50 s$^{-1}$).

13. Ready-to-use bakery custard according to claim 1, wherein the custard is sterilized and has a shelf-life of at least 4 months at 20° C.

14. Bakery products, provided with a portion of a bakery custard, wherein the bakery custard is a custard according to claim 1, wherein optionally a flavour has been incorporated.

15. Bakery product according to claim 14, wherein the product is a vanilla slice (or a "millefeuille" or "tompoes"), or a creme mousseline.

16. Process for the preparation of a bakery custard with the composition according to claim 1, wherein:
   1) a premix is made at a temperature of 40°–70° C. of the water continuous fat emulsion, the sweetener, the modified starch, the gelatin relating compound and the hydrocolloid.
   2) the premix is heated by indirect heat exchange to 50°–100° C.
   3) the heated premix is sterilized by indirect heat exchange at temperatures of 130°–150° C. during 1–20 seconds.
   4) the sterilized product is cooled by indirect heat exchange to a temperature between 20° and 70° C.
   5) the sterilized product is packed aseptically in a package material.

17. Process according to claim 16, wherein the indirect heat-exchange is performed by using a tubular heat exchanger, or a surface scraped heat exchanger or by combinations thereof.

* * * * *